July 26, 1932. I. COWLES 1,868,629

FORCE FEED LUBRICATING SYSTEM

Filed March 31, 1926   4 Sheets-Sheet 3

Inventor
Irving Cowles
By Rudolph Im Fox
Attorney

Patented July 26, 1932

1,868,629

UNITED STATES PATENT OFFICE

IRVING COWLES, OF DETROIT, MICHIGAN, ASSIGNOR TO UNION BANK OF CHICAGO, OF CHICAGO, ILLINOIS, A CORPORATION OF ILLINOIS, TRUSTEE

FORCE FEED LUBRICATING SYSTEM

Application filed March 31, 1926. Serial No. 98,886.

This invention has for its object to provide very simple and efficient mechanism for supplying lubricant under pressure from a single source simultaneously to a multiplicity of bearings in substantially predetermined volume as to each bearing and such intervals, either manually or automatically controlled as may be deemed necessary or desirable.

The invention is based primarily upon the utilization of high pressure expressed in terms of velocity of flow of liquid to accomplish the results above mentioned by means of devices of elementary simplicity and cheapness which possess the added advantage of being incapable of becoming clogged by small solid particles carried by the lubricant and the further advantage of permitting either a very light or very heavy lubricant to be employed interchangeably.

The invention may be expressed in terms of method as consisting in applying at each discharge point of a conduit system a device actuated by liquid velocity to effect the discharge of a substantially predetermined volume of the liquid at each of said discharge points (except under special conditions hereinafter set forth), maintaining the conduit constantly filled with the liquid, supplying thereto at intervals an amount of liquid in excess of the aggregate amount discharged from all of the discharge points and under an initial and maintained pressure and velocity substantially equal to the maximum pressure and velocity capable of being developed and maintained in said conduit, and thereafter following the discharge at each of said discharge points, effecting the further discharge from said conduit of a measured volume of the liquid sufficient to relieve the pressure without, however, draining any part of the conduit or said devices at the discharge points of liquid, thereby trapping the liquid in said conduit and devices.

The invention further comprehends, mechanically, a pump constructed to be inoperative to deliver liquid until the pressure within the pump has attained the maximum pressure capable of being maintained in the conduit and thereupon discharging the liquid under this maximum pressure into the conduit with an initial and sufficiently long maintained velocity (due to high pump pressure) to cause the devices at the discharge points to operate to permit discharge of substantially measured quantities of the liquid at each point and thereupon cut off further discharge.

A further object of the invention is to provide a pump which, during its initial discharge stroke builds up pressure as aforesaid, then during another part of its stroke discharges under high pressure and velocity and thereafter and during the completion of its discharge stroke, relieves pump pressure and permits the instant relief of the conduit pressure without, however, permitting drainage of the conduit beyond an amount of liquid sufficient to relieve pressure.

A further object of the invention is to provide a pump for the purpose specified, which may be either manually or automatically operated and to provide simple and efficient means for automatically operating the same.

Other objects of the invention will be fully comprehended from the following specification.

The invention comprehends, primarily, mounting upon each bearing to be lubricated, a very simple and efficient device for permitting flow to said bearing during a brief time interval, lubricant under high pressure, the interval being determined by the degree of the pressure and the consequent velocity of flow of the lubricant and being dependent upon velocity in excess of a predetermined minimum below which a continuous flow of lubricant during a feed interval will take place.

Figures 8, 9, 10, 11, 14:
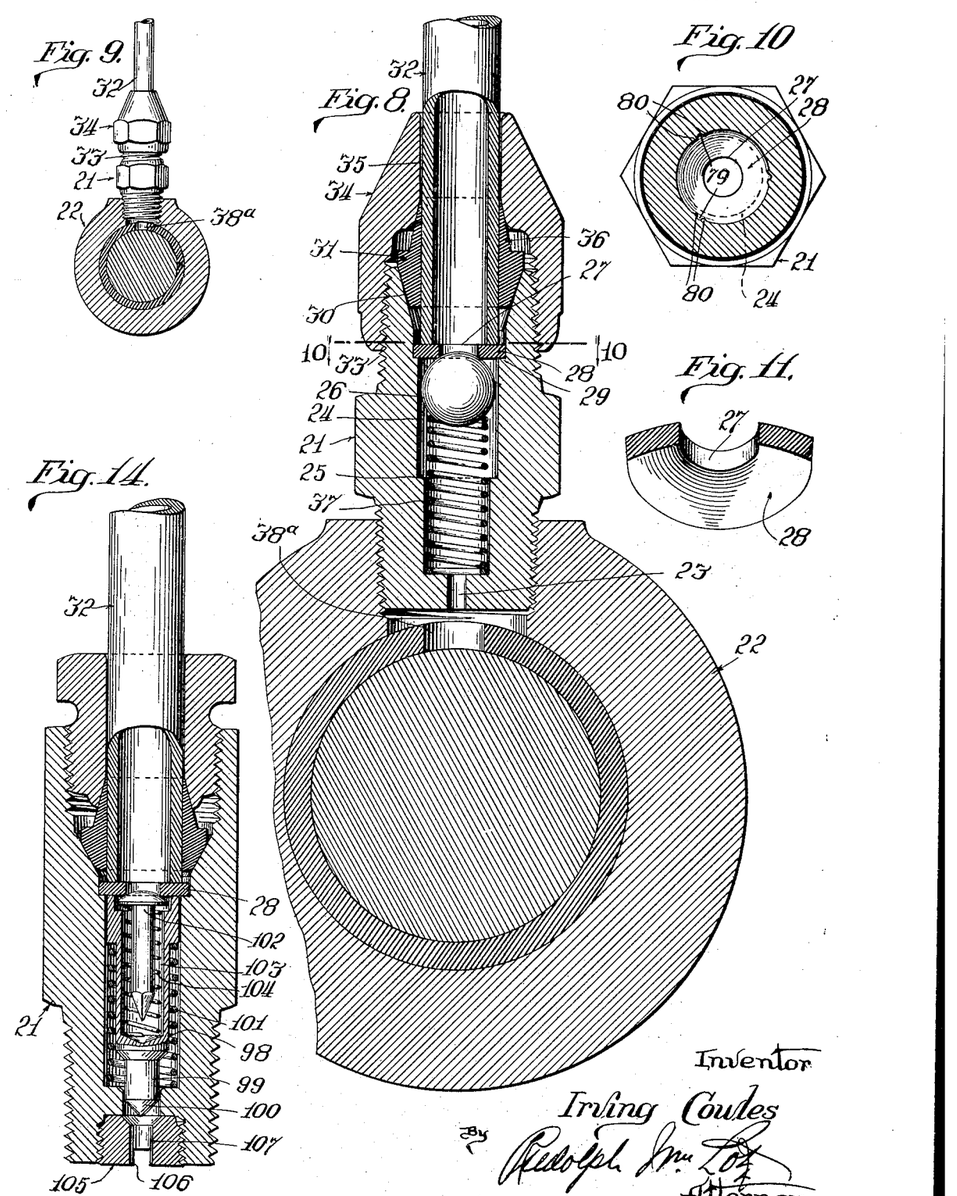
Fig. 8 is a central longitudinal section of a metering device for association with a bearing showing the same equipped with a compression coupling.
Fig. 9 is a view in elevation of said device.
Fig. 10 is a transverse section of the same on the line 10—10 of Fig. 8.
Fig. 11 is a perspective section of a washer constituting an element of the metering device.
Fig. 14 is a sectional view of a modified or adjustable type of metering device.

Each of the said devices comprises a casing 21 threaded at one end into a bearing 22 and having a discharge opening 23 sufficiently small to prevent drainage of oil from the casing except under the influence of pressure at the intake end thereof. Said casing is provided with an axial stepped bore 24 providing a valve-seat 25 between its ends upon which the ball-valve 26 is adapted to seat, the latter being reciprocable in the larger diameter portion of the bore 24 between said seat 25 and the intake port 27. The latter is formed in the washer 28 which is driven into the mouth portion of the casing to rest upon the annular shoulder 29 at the outer end of the larger diameter end portion of the bore 24. The mouth portion of the casing 21 is formed to constitute a member of a compression pipe coupling of the type fully described and claimed in my copending application for patent, Serial No. 25,873, filed April 25, 1925. Briefly, it provides the seat 30 for the ferrule 31 through the end of which a copper tube 32 is passed, the casing being provided with external threads 33 to engage the nut 34 having a central opening 35 in which the tapered flange 36 of the ferrule engages for contraction into the copper tube as the nut is turned in one direction. The threads 33 are of standard tapered pipe thread type which permit the casing 21 as shown in Fig. 8 to be directly associated with a pipe fitting such as a T or elbow instead of with other elements of a compression pipe coupling, as shown in Fig. 8.

A compression spring 37 of a diameter smaller than the ball valve 26 and the smaller diameter bore of the casing, holds the said valve normally seated to seal the instake opening 27 in the washer 28. The ball valve 26 is of considerably smaller diameter than the larger diameter portion of the bore 24 so as to permit a relatively free flow of oil around the same, the area of said free space being, however, less than the area of the discharge port 23 for reasons hereinafter pointed out.

This device may be made sufficiently small to contain only a few drops of oil or to contain a very appreciable volume thereof. The amount of oil discharged at each movement of the valve 26 from the washer 27 to the seat 25, is dependent upon the length of said stroke, the diameter of bore portion in which said valve moves, the area of the annular space around said valve, the degree of viscosity of the oil and the pressure and consequently velocity of the oil entering the intake port.

The bearings to be lubricated may differ in size and otherwise to require proportionate quantities of lubricant and, to this end, the casings 21 are made in different sizes as to diameter of bore and length of travel of the valve 26 to suit the needs of the several bearings. These different size devices may be all associated with a common conduit and pump, it being, however, quite necessary for best results, that all springs 37 of said devices shall exert substantially equal pressure on the valves proportionately to the diameters of the latter.

Unless this condition pertains, the stronger springs will resist movement of their associated valves 26 to the seats 25 to an extent causing more leakage past said valves during this movement than will occur in the devices having the weaker springs and thus the accuracy of measurement of volumes of oil delivered to the bearings will suffer. Furthermore, after all valves 26 are on the seats 25 and pressure thereon is released to permit spring return of the valves, those of the latter subjected to the stronger springs will tend to force oil back in the conduit under greater pressure than the valves subjected to the weaker springs and, consequently, may cause some leakage past the latter during spring return movement of all of said valves.

It will also be quite obvious that velocity of flow and the pressure necessary to produce such velocity is desirable only to primarily assure discharge at every discharge point in the system of the volume of lubricant intended to be discharged thereat. In practice there is an oil pocket 38a in the bearing into which the oil flows gradually to become distributed throughout the bearing. In a loose bearing this distribution occurs very quickly but in a tight bearing it is apt to occur so slowly as to cause the oil pocket to become completely filled by successive discharges of oil into the same before they become drained. In that case further discharge into the pocket will be resisted to such an extent as to prevent the valve 26 from moving to the seat 25 because of the by-passage of lubricant and the almost instantaneous equalization of pressures on opposite sides of the same. Consequently, the accumulated pressure in the casing 21 will almost instantly become substantially equal to the maximum conduit pressure and this will be maintained so long as the discharge stroke of the pump continues with the result that the flow from such individual casing 21 will continue until the conduit pressure is relieved. During this period there will be a continuous flow of oil under high pressure into the bearing, the total volume so fed being determined mainly by the degree of resistance to the flow. Thus the system automatically feeds most oil where most is needed due to the local condition referred to.

It will be noted that the seat 25 is of relatively large diameter so that a pressure in excess of the spring resistance will easily maintain the valve 26 seated. This makes very necessary a relief of the conduit pressure on the valves 26 in order that the latter may return to normal positions. This spring return has a tendency, as aforesaid, to push oil from the casings 21 back into the conduit so that, if the same were open at any point, oil would be discharged therefrom and air or oil sucked into the discharge ends of the casings 21 from the bearings. It is, therefore, quite essential that beyond taking from the conduit enough oil to relieve the pressure to a sufficiently low point (preferably atmospheric) to permit spring return of the valves 26, there must be no leakage from said conduit. This I provide for at the point of entry of oil into the conduit from the pump as hereinafter fully described. In other words, the oil in the conduit and casings 21 will take the course of least resistance under the influence of any impelling force and it is therefore, very necessary to insure the absence of any opening which will permit backflow of oil through the conduit and out of the same during the spring return of the valves 26. Were such leakage possible, those casings 21 that are connected with loose bearings offering little or no resistance to the passage of air therethrough, would become partially filled with air during the spring return of the valves 26 and would consequently receive correspondingly less oil upon the next pump discharge into the conduit.

In the manual or mechanical operation of a pump, it is very desirable that there shall be no sudden stop of the pump-piston such as would necessarily occur when, in the absence of a pressure relief valve, the valves 26 become seated, or which, in the presence of a relief valve, would occur when the pump-piston attains the limit of its stroke. In the pump herein illustrated, I provide for a smooth operation which starts under substantially maximum resistance and eases off just previous to the end of the pressure stroke and is then so cushioned as to avoid shock or jar to the operator or the actuating mechanism and which affords the further advantage, in the case of manual operation, to indicate to the operator by "full" whether there is any leak in the system, the easing off of the resistance before the end of the discharge stroke constituting the means for apprising the operator of the condition of the system with respect to a leak or break at any point therein. The point at which this leak or break is located is easily found from drippings and repair is easily and quickly effected. This constitutes an important feature of the invention.

Another object of the invention as regards the pump, per se, lies in so constructing the latter as to render it amply strong and durable to perform its function under all of the varying conditions of its use while also rendering it easy to operate so that a woman or child may operate it and develop the pressure of oil (generally about 200 pounds per square inch) to the point necessary to effect operation of the system. Compactness and low cost of construction are also very desirable and, in many instances, very essential and the pump of my invention combines all of these desirable characteristics.

Figures 1, 2:
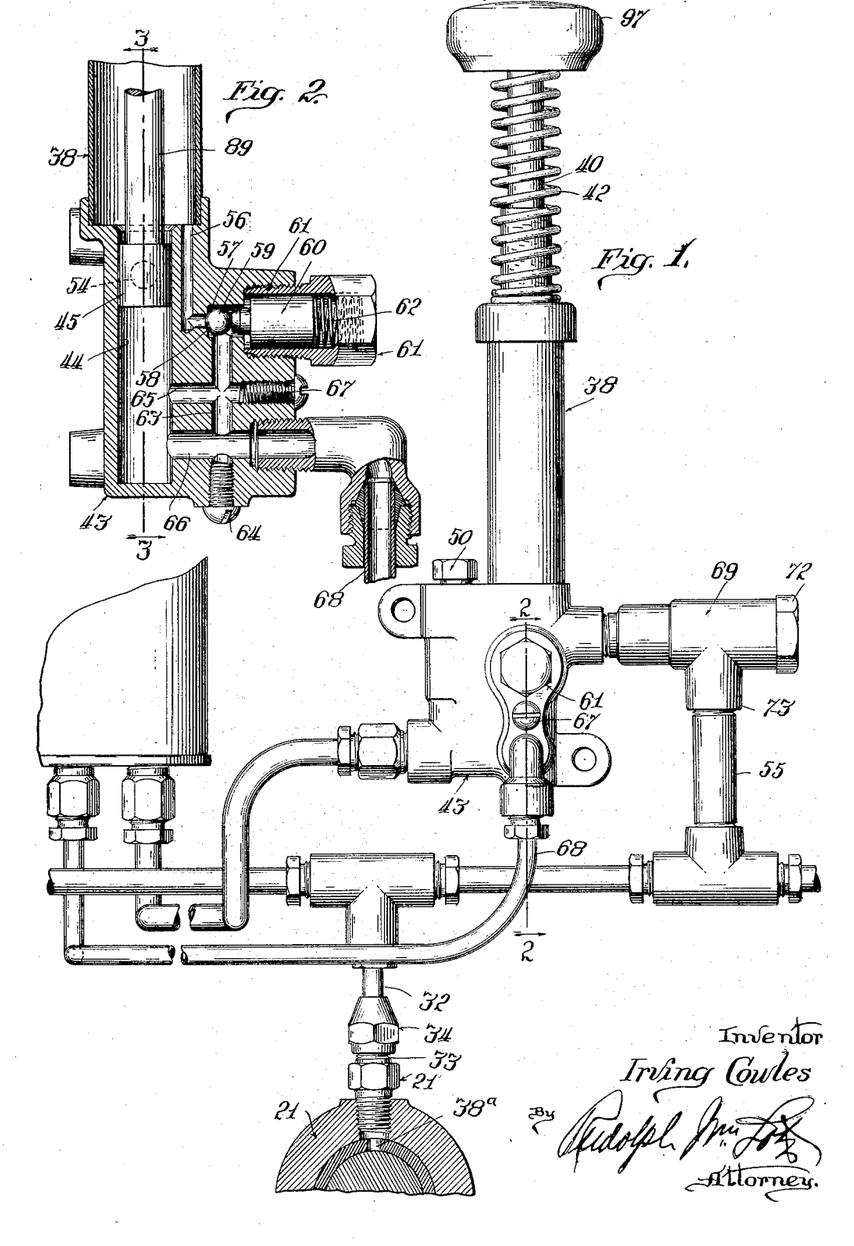
Fig. 1 is a view in side elevation of a pump, a tank and a metering device associated with a bearing, constructed in accordance with my invention.
Fig. 2 is a fragmentary sectional view of the pump on line 2—2 of Fig. 3.
Figures 3, 4, 5, 6, 7:
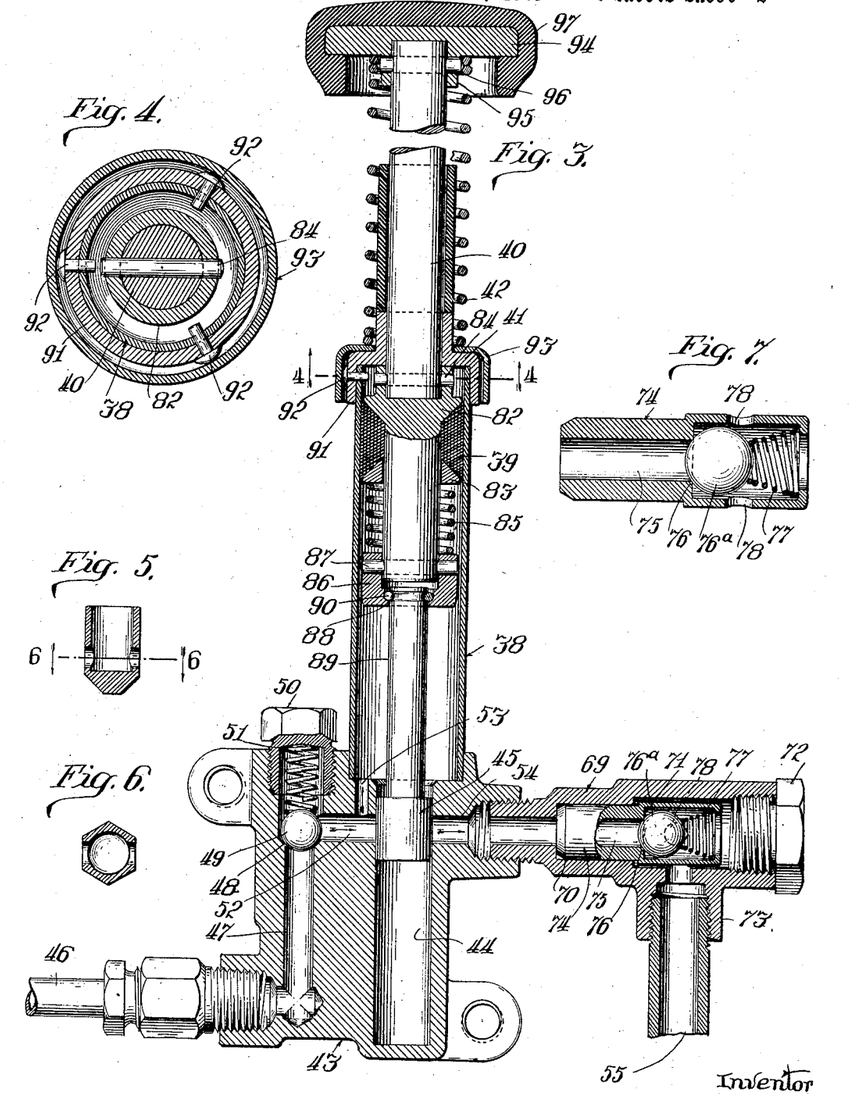
Fig. 3 is a complete sectional view of the pump on the line 3—3 of Fig. 2.
Fig. 4 is a transverse section on the line 4—4 of Fig. 3.
Fig. 5 is a central longitudinal section of the suction check-valve of the pump and Fig. 6 is a transverse section of the same on the line 6—6 of Fig. 5.
Fig. 7 is a central longitudinal section of the discharge check-valve of the pump.

The said pump comprises pump cylinder 38, the pump-piston 39 reciprocable in said cylinder 38, the piston-rod 40 projecting from the cylinder head 41, a compression spring 42 for normally maintaining the piston at one limit of its stroke; a valve casing 43 associated with the discharge end of the cylinder 38 and having a bore 44 of smaller diameter than and concentric with that of the cylinder 38, an auxiliary piston or plunger 45 reciprocable in the bore 44 and associated with the piston rod 40 for coordinate movement therewith.

The valve casing 43 is connected by means of pipe 46 with a source of lubricant, said pipe communicating with a duct 47 formed in the wall of said casing and provided between its ends with the valve seat 48 upon which the spring-held valve 49 seats. The duct 47 extends mainly parallel with the bore 44 and to one end of said casing where it is sealed by the screw-plug 50 against which one end of the valve-spring 51 bears. A lateral branch 52 connects the duct 47 with the bore 44 and the branch 52 is connected by means of a branch duct 53 with the discharge end of the cylinder 38.

The discharge port 54 from the bore 44 into the conduit 55, with which the several casings 21 are associated, is disposed diametrically opposite the branch intake duct 52, both thereof being disposed adjacent to the discharge end of the cylinder 38 and intake end of the valve casing 43.

A discharge duct 56 extends from the discharge end of cylinder 38, parallel with bore 44 to a lateral bore 57 in which is a valve-seat 58 on which a spring-held relief valve 59 seats. The latter consists of a small sphere. Back of this is a reciprocable plunger 60 disposed in a casing 61 having threaded connection with the casing 43 and containing the compression spring 62 for holding the plunger 60 in contact with the valve 59 for maintaining the latter seated under a pressure capable of resisting substantially, for example, two hundred pounds per square inch fluid pressure, in the duct 56.

Communicating with the bore 57 back of the valve-seat 58, is a bore or duct 63 extending to the outer end of the casing where it is sealed by the screw-plug 64. This duct 63 is intersected by two lateral ducts 65 and 66 extending from the bore 44 to the outer surface of the casing 43 said duct 65 being sealed at its outer end by the screw-plate 67. This duct 63 is connected by pipe 68 with the source of lubricant for unrestricted flow, the suction duct 47 also being connected with said source. The ducts 66, 65 and 57 extend perpendicularly to the lateral ducts 52 and 54. The portion of the bore 44 below the lateral duct 66 constitutes a dash-pot for the plunger 45.

Interposed between the discharge port 54 and the conduit or pipe 55 is a valve-casing 69 having a bore which includes a small diameter end portion 70 and a larger diameter end portion 71, the former opposing said discharge port 54 and the latter being sealed at its outer end by the screw-plug 72 and communicating between its ends with the lateral branch 73 leading to conduit 55.

A hollow cylindrical valve 74 of slightly less length than the casing 69 and of an outer diameter substantially equal to that of the end portion 70, is reciprocably mounted in said casing 69. The valve 74 has a central bore 75 between the ends of which is a valve-seat 76 for the ball-check 76a which is normally maintained on said seat by the spring 77. Lateral openings 78 adjacent the valve-seat permit the passage of lubricant forced past the check-valve into the free annular space around the outer end of said valve and thence into the conduit 55, said valve-seat and valve being arranged to permit forced passage of liquid delivered from the pump but not permitting return flow thereof.

The piston or plunger 45 constitutes a slide valve which, when at the normal, spring-held limit of its movement, closes the mouths of the ducts 52 and 54. Consequently the discharge end of cylinder 38 now communicates only with the suction and relief-valve ducts 53 and 56 so that the initial discharge stroke of piston 39 is entirely against the resistance offered by the relief-valve 59 and necessitates a building up of the pump pressure to the point required to open said relief-valve. This occurs before the plunger valve 45 uncovers the discharge duct 54. When this occurs, the oil under maximum pump pressure rushes into the said duct and this causes a momentary but hardly perceptible drop in resistance to further movement of the piston 39 until the pressure in the valve casing 69 and conduit 55 has attained the initial high pressure equaling that necessary to overcome the resistance of the relief-valve. As the movement of the piston 39 is continuous and rapid and the total capacity of the pump is considerably in excess of the amount of lubricant necessary to feed all of the devices 21, and in view of the fact that the conduit 55, devices 21, and valve casing 69 are already completely full of oil, the response of the valves 26 to the substantially rapid flow of oil under the high pressure, is substantially instantaneous. The resistance to continued movement of the piston 39 is practically constant during and following flow into conduit 55 which ceases of course, as soon as the valves 26 reach the seats 25, the surplus of oil passing the relief-valve to the source of supply via conduits 63 and 66, and pipe 68.

The oil that first passes into the valve casing 69 moves the valve 74 to the outer limit of its movement where it remains while the further lubricant passes the check-valve 76a until flow into conduit is stopped by the seating of the valves 26. The pressure in valve casing 69 continues substantially equal to the relief-valve pressure until the plunger valve 45 has partly passed and opened the mouth of the lateral duct 65 to thereby directly connect the cylinder 38 with the source of supply of lubricant for unrestricted flow. Further resistance to travel of the piston 39 being now practically absent, the piston will obviously move very rapidly to the limit of its movement which is attained when the plunger valve 45 passes into the dash-pot formed below the duct 66. This instant relief of pressure permits the valve 74 to move back to initial position under the influence of back-pressure in the conduit 55 due to the pressure of the springs associated with the valves 26. This return movement permits the backflow of only a very few drops of oil from conduit 55 into valve casing 69 but not back to the cylinder 38 because of closure of the valve 76a prior to relief of pump pressure. Consequently all except these few drops of oil is trapped in the conduit 55 and casings 21 which remain full, the oil above the valves 26 by-passing the latter as they are spring returned to their normal positions.

Leakage past one or more of said valves 26 during the pressure stroke of the pump piston due to tight bearings as above explained, does not affect the operation above described after the plunger valve 45 has passed duct 65.

The communication of the lower end of bore 44 with the source of supply of lubricant is obviously necessary in order that there may be no appreciable resistance to movements of the plunger valve 45.

It will be particularly noted that the larger end portion of the valve casing 69 constitutes, in effect, a part of the conduit 55 and that therefore, the pressure in the latter and the casings 21, is relieved without withdrawing a drop of fluid from the system beyond the check-valve 76. Thus every drop of oil that passes the check-valve 76 is trapped.

If, however, the larger end portion of the valve casing 69 is not regarded as a part of the conduit 55, then the relief of pressure within the latter may be said to be effected by the withdrawal or leakage or backflow therefrom of a limited volume of the lubricant which becomes trapped in the valve-casing 69. In the absence of everything except liquid and metallic operative elements in the valve casing 69 and the valve casings 21, the pressure in the several valve casings and conduits is purely hydraulic and is, therefore, relieved by the back-flow of a very minute quantity or proportion of the lubricant fed at each pump stroke.

Obviously, if the relief valve is to be set to provide for the development of pump pressure of high degree, it will be necessary for priming the system to primarily set the relief valve for very low pressure until all air has been exhausted from the pump, the valve casing 69, the conduit 55 and the valve casings 21, whereupon the relief valve may be set for the desired high pressure.

Under certain conditions of shock and vibration as pertain in automotive vehicles, to which this apparatus is well adapted, the casings 21 may discharge oil between pump operations (though the small area of the discharge ports and the viscosity of the lubricant adapted for this purpose would probably, obviate this) then the discharge ends of the said casings will become filled with air. The sudden rush of lubricant at high velocity into said casings will prevent such air from passing the valves 26 and finding its way into the conduit 55. If air becomes trapped in the latter it may seriously interfere with proper operation because of its extreme compressibility. The sudden high velocity flow of lubricant is very advantageous also in that it carries air with it for discharge.

With reference to certain advantageous details of construction, it will be seen, by reference to Fig. 11 that the washer 28 is normally dished. When forced into place on the shoulder 29 of the casing 21, it is also flattened as shown in Fig. 8 and thereby expanded to more firmly fit the bore above or outwardly of said shoulder 29. In seating said washer 28, a tool is used which also cuts very small grooves 79 in the bore outwardly of the washer and forms burrs or lugs 80 which bear upon the outer face of said washer to positively prevent its displacement by pressure of the spring 37.

Figures 12, 13, 15:
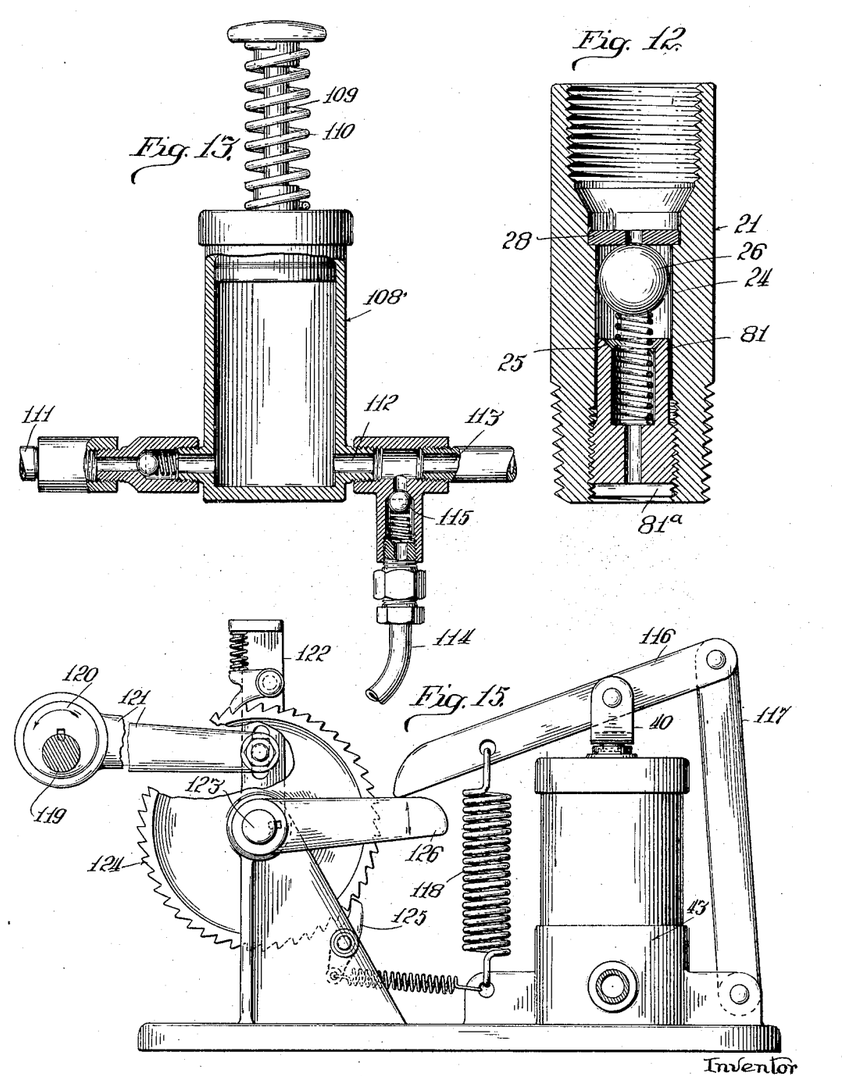
Fig. 12 is a view similar to Fig. 8 of another embodiment of the metering device.
Fig. 13 is a sectional view of a pump adapted for use in connection with the type of metering device shown therein and in Fig. 14.
Fig. 15 is a side elevation, partly in section, of a power actuated pump operating mechanism which may be employed to actuate the pump at intervals.

If so desired, as shown in Fig. 12, the amount of lubricant discharged from the casing 21 at each operation may be adjusted by varying the discharge stroke of the valve 26, this being accomplished by disposing the valve seat 25 upon the inner end of a sleeve 81 snugly telescopically fitting the bore 24 of the casing and, at one end, having threaded association with the discharge end of said casing, there being a transverse slot 81a in the threaded end portion of said sleeve 81 for engagement with a screw-driver.

To make the casing 21 of a single piece of metal, except as to the washer 28 is, however, most advantageous in the case of small sized devices for cost economy and strength, though for larger sizes the adjustability is desirable.

Aside from the above described advantageous characteristics of the pump 38 and the valve casing 43, the pump 38, per se, possesses economically advantageous features which I shall now describe.

The pump-barrel 38 may conveniently consist of a piece of standard brass pipe sweated to or otherwise permanently coupled with the valve casing 43, a threaded connection being more costly and more liable to disorder than a sweated joint. The piston-rod 40 is of large diameter and projects through the piston 39, the necessity for a piston of large diameter proportionately to the pump-barrel being obvious when it is considered that a high pressure must be created in the latter. For purposes of strength and durability I prefer to make the pump-barrel and piston rod, respectively, of much larger diameter than would be ordinarily necessary, there being also an economic advantage in requiring less accuracy in manufacture.

The piston 39 is a composite structure consisting of a collar 82, a collar 83, said collars having opposed beveled faces, suitable packing material disposed between said collars, a pin 84 rigidly connecting the collar 82 with the rod 40, a spring 85 bearing upon the collar 83 to normally force it toward the collar 82 to thereby compress the packing, a collar 86 secured by pin 87 to the inner end of the rod 40 and having an annular inturned flange 88 disposed beyond the end of the piston 39.

The rod 89 constituting the stem of the piston valve 45 is separate from the rod 40 and abuts against the inner end of the latter. It is passed through the opening in the collar 86 which is bordered by the flange 88 and is provided with an annular groove in which the split collar 90 is received, the projecting portion of the latter constituting a shoulder for engagement with the flange 88 to prevent relative longitudinal movement of the collar 86 and rod 89 in one direction. In assembly, the collar 82 is first mounted on rod 40, then collar 83 and spring 85 are mounted thereon. The collar 86 is then mounted on rod 89 and the split collar 90 put in place. Then the pin 87 is passed through collar 86 and rod 40. The packing is then wound on the rod 40 between the collars 82 and 83 while the latter are forcibly spaced apart against the action of spring 85.

The connection between rods 40 and 89 is such that it permits slight disalignment of the bores of the cylinder and valve casing such as might occur in ordinary factory practice. The pins 84 and 87 are held in place by the bore of the tube 38.

The cylinder head 41 consists of a cupical washer, the annular flange 91 of which telescopically receives the end of the tube 38 and is held in place thereon by a plurality of escutcheon pins 92 the heads of which are engaged by the annular flange of the cup-washer 93 disposed over the washer 41. The spring 42 bears at one end on the washer 93 and at its other end upon the inner face of the annular flange of the cap member 94 for the piston rod 41. Said cap member 94 has a central bore bordered by the hub-element 95 and is held in place by the pin 96 which is in turn held in place by the surrounding portion of the spring 42. The cap member is preferably partly housed by a rubber cap 97.

The absence of threaded joints is not only economical from the manufacturing and assembly standpoints but also from that of liability of the pump to disorder. The structure as illustrated is very quickly assembled and disassembled. The type of piston shown and described is also very advantageous for characteristics of long wear and self adjustment.

In Fig. 14, I have illustrated another embodiment of the invention wherein the devices consisting of casings 21 and washers 28 (as in Fig. 8) contain a different type of valve and also check-valves. The valves consist of piston like members 98 of so much smaller diameter than the portion of the bore of the casing 21 in which they move as to permit by-passage of lubricant. Said members 98 are provided with stems 99 terminating in conical points 100 for seating on the mouths of the discharge ports of said casings when the members 98 attain their limit of movement against the action of the springs 101. The check-valve of each of the devices consists of an escutcheon pin 102 the head of which seats on the washer 28 to seal the intake port, the shank of the pin extending into the central bore 103 of the member 98. A spring 104 bearing on the bottom of bore 103 and against the head of the pin, maintains the latter normally on its seat.

The springs 104 and 101 are so proportioned as to pressures exerted that the latter easily overcomes the former to such an extent that when the member 98 is at the spring-held limit of its movement it bears against the head of the escutcheon pin and so that at this time, the pressure on the said pin greatly exceeds that exerted by the spring 104. If desired, the mouth of the bore 103 may be countersunk to receive the head of the escutcheon pin or check valve and permit the member 98 to seat on the washer 28, this modification being shown in Fig. 14, together with a means for varying the stroke of the member 98. This means consists of a screw-plug 105, having the transverse slot 106 in its outer end, which is threaded into the discharge end of the casing 21 and contains the central discharge port 107 on which the conical end of the stem of the member 98 is adapted to seat.

In either type of metering device shown in Figs. 12 and 14, it is quite essential that the area of the discharge port shall be no less than that of the free annular space around the member 98 and preferably somewhat greater. It is also essential, especially in the structure shown in Fig. 14, that the area of the discharge port shall be so proportioned to the strength of the spring 101 that the latter may move member 98 against the counter force of the greatest pressure of lubricant in the casing as determined by the relief valve associated with the pump or otherwise in order that the member 98 may not be permanently held on casing 21 as, obviously, that pressure can be relieved only by leakage at the discharge port.

In operation the member 98 is actuated against the spring 101 only by liquid velocity but as soon as it reaches the limit of its movement to seal the discharge port, there is an almost instantaneous equalization of pressure on opposite sides of the member 98 so that if the spring 101 exerts a pressure greater than the fluid pressure exerted on an area equal to that of the discharge port or the seat bordering the same, it will instantly overcome said fluid pressure and move the member 98 back to normal position. If, however, the pump-piston is still making its normal discharge stroke, the initial spring return movement of the member 98 will unbalance the pressure on opposite sides thereof by reason of leakage through the discharge port with the result that fluid pressure will again overcome the spring-pressure and reseat the member 98. The leakage thus occurring is inappreciable.

The sole advantage of this type of metering device over that shown in Fig. 8 is that it obviates the need of providing means for relieving the presure in the conduit by back-flow of a part of the liquid as hereinbefore described and permits the use of any ordinary pump having a check-valve controlled discharge port and permitting also the use of such a pump devoid of a check-valve at its discharge port. I have shown the last-mentioned type in Fig. 13, though in place thereof, I prefer to use the pump shown in Figs. 1 to 3, without the valve housing 69, as being best adapted for reasons hereinbefore mentioned for the particular conditions pertaining to a system of this nature, and, further, because it lends itself readily to automatic operation as hereinafter described. If a pump of the type shown in Fig. 13 is used and is equipped with a check-valve controlled discharge port, then the check-valves of the metering devices at the bearings may be omitted because in that event, the oil discharged into the conduit will be trapped.

The pump shown in Fig. 13 consists of the barrel 108 of suitably small diameter and commensurate length to deliver more liquid than is required to supply all of the metering devices associated with the bearings to be lubricated. The plunger 109 of the pump is preferably held by the spring 110 at the end of its suction stroke and is manually operated against the resistance of said spring. It has a check-valve controlled intake port connected with pipe 111 leading to suitable source of lubricant. The discharge port 112 of the pump is devoid of a check-valve and communicates with the conduit 113 common to all of the metering devices. Said conduit 113 connects by means of pipe 114 having relief valve 115 interposed therein with the source of supply of lubricant. The discharge port 112 may be equipped with a check-valve if so desired though this is obviously not necessary because of the presence of check-valves in the metering devices.

In this type of pump the building up of pressure and consequent velocity of flow of liquid through the conduit and casings 21 is dependent upon the degree of pressure initially and continuously applied to the piston rod by the operator. A slow movement of said plunger, insufficient to impart the requisite degree of velocity to the liquid, will develop sufficient pressure to open the check-valves of the metering devices and cause a continuous flow of liquid through the casings 21, this being advantageous for priming purposes or for flooding the bearings, the metering devices being irresponsive to slow flow under low pressure and, therefore, substantially inoperative, under such conditions, to perform their normal function.

In Fig. 15, I have shown, in elevation, a pump which may be of the type of construction shown in either Figs. 1 to 3 or Fig. 13, but wherein the plunger is spring-actuated during its discharge stroke and is operated for its suction stroke against the action of said spring by means of suitable power actuated mechanism associated with an operating part of a machine to be lubricated at regular intervals during operative periods.

The plunger 40 of the pump 43 is pivotally connected with the lever 116 between the ends of the latter. Said lever is pivotally connected at one end with a connecting rod or link 117 which is pivotally connected with the valve casing 43. A strong tension spring 118 is connected at one end with the lever 116 and at its other end with the valve casing 43 to thereby hold the plunger 40 normally at the inner limit of its movement.

A shaft 119 of a machine to be automatically lubricated is equipped with an eccentric 120 which reciprocates the connecting rod 121. The latter is pivotally connected with a rocking lever 122 pivotally mounted on the shaft 123 of the ratchet wheel 124. A spring-held dog on the lever 122 engages the ratchet 124 to impart slight rotary movement thereto in one direction during each rotation of the shaft 119. A second dog 125 prevents reverse rotation of the ratchet. A trip lever 126 rigid with the ratchet 124 engages the free end portion of the lever 116, to impart movement thereto against the resistance of spring 118 to thereby impart suction stroke to the plunger 40 and, at a given point, as said trip lever 126 passes out of engaging relation to the lever 116, the spring 118 returns the plunger 40 to initial position and during this movement oil is discharged from the pump as hereinbefore described.

It will be understood, of course, that the trip mechanism above described is merely exemplary of a suitable means for effecting automatic intermittent operation of the pump, it being easily within the skill of the average mechanic to devise mechanism adapted to the machine to be lubricated, taking advantage of any element or part of such machine best adapted to the purpose. Obviously in a planing machine, the reciprocatory bed may be utilized to operate the pump of the type shown in Figs. 1 to 3 or the type shown in Fig. 13 by merely disposing the pump plunger in the path of the reciprocating element. This is so obvious as to be readily comprehensible by persons skilled in the art as to render illustration superfluous.

I claim as my invention:—

1. In a lubricating system, the combination with fluid pressure actuated devices associated with bearings for limiting the flow of lubricant thereto, of means for delivering the lubricant under pressure to said devices at intervals, said means including a device for determining the maximum limit of pressure of the lubricant, and means for preventing delivery of the lubricant to said first-named devices until the same is under the said maximum pressure.

2. In a lubricating system, the combination with valve casings and valves associated with bearings for controlling flow of lubricant to said bearings, of means for delivering lubricant under pressure to said valve casings, said means including a device for determining the maximum pressure of the lubricant, means for preventing delivery of lubricant to the valve casings until the same is under the said maximum pressure, and means for relieving the said pressure following the feed of the lubricant to the valve casings without withdrawing lubricant from the latter without permitting escape of trapped oil therefrom.

3. In a lubricating system, valve casings associated with bearings, spring-held fluid velocity responsive valves in said casings normally positioned to prevent flow of lubricant into the intake ends of said casings and to seal the discharge ends of said casings in response to flow into the latter, a conduit common to all of said casings, a pump having a check-valve controlled discharge port connected with said conduit, a relief valve for the pump barrel for limiting the attainable pressure therein and discharging surplus lubricant therefrom, and means associated with the discharge port and the pump piston for preventing discharge of lubricant into the conduit until pump pressure has attained the maximum pressure.

4. In a lubricating system, valve casings associated with bearings, spring-held fluid velocity responsive valves in said casings normally positioned to prevent flow of lubricant into the intake ends of said casings and to seal the discharge ends of said casings in response to flow into the latter, a conduit common to all of said casings, a pump having a check-valve controlled discharge port connected with said conduit, a relief valve for the pump barrel for limiting the attainable pressure therein and discharging surplus lubricant therefrom, means associated with the discharge port and the pump piston for preventing discharge of lubricant into the conduit until pump pressure has attained the maximum, and means associated with the conduit for permitting discharge therefrom of sufficient lubricant to relieve the pressure therein and permit reopening of said valves in said casing without permitting back-flow from said casings into said conduit.

5. In a lubricating system, valve casings associated with bearings, spring-held fluid velocity responsive valves in said casings normally positioned to prevent flow into while permitting discharge from said casings to the bearings and permitting by-passage of lubricant throughout the paths of movement of said valves, valve-seats between the ends of said casings on which said valves are adapted to seat to shut off flow to the bearings, a conduit common to said casings, a pump having a check-valve controlled discharge port common to said casings and intermittently operable to feed the same, and means for limiting the maximum pressure of lubricant within the pump and preventing discharge from the latter until said maximum pressure is attained to thereby cause the lubricant to be discharged from said pump at high velocity.

6. In a lubricating system, valve casings associated with bearings, spring-held fluid velocity responsive valves in said casings normally positioned to prevent flow into while permitting discharge from said casings to the bearings and permitting by-passage of lubricant throughout the paths of movement of said valves, valve-seats between the ends of said casings on which said valves are adapted to seat to shut off flow to the bearings, a conduit common to said casings, a pump having a check-valve controlled discharge port common to said casings and intermittently operable to feed the same, and means for limiting the maximum pressure of lubricant within the pump and preventing discharge from the latter until said maximum pressure is attained to thereby cause the lubricant to be discharged from said pump at high velocity, and means associated with said conduit for permitting leakage of a fixed volume of lubricant therefrom following the discharge operation of the pump for relieving pressure in said conduit and valve casings to permit spring-return of said valves to their normal positions.

7. In a lubricating system, valve casings associated with bearings, spring-held fluid velocity responsive valves in said casings normally positioned to prevent flow into while permitting discharge from said casings to the bearings and permitting by-passage of lubricant throughout the paths of movement of said valves, valve-seats between the ends of said casings on which said valves are adapted to seat to shut off flow to the bearings, said valves adapted to be maintained seated on said last-named seats so long as the pressure in said casings exceeds the counter-pressure of the springs holding said valves, a conduit common to said casings, a pump having a check-valve controlled discharge port common to said casings and intermittently operable to feed the same, and means for limiting the maximum pressure of lubricant within the pump and preventing discharge from the latter until said maximum pressure is attained to thereby cause the lubricant to be discharged from said pump at high velocity to thereby cause said valves to be moved to and held on the last-named seats, and means associated with said conduit for permitting leakage of a fixed volume of lubricant therefrom following the discharge operation of the pump for relieving pressure in said conduit and valve casings to permit spring-return of said valves to their normal positions.

8. In a lubricating system, the combination with a conduit and a bearing, of means for intermittently feeding lubricant under pressure to said conduit, a valve casing associated at its discharge end with the bearing and at its intake end with the conduit, a valve seat at the intake end of said casing, a valve seat between the ends thereof, a spring-held ball check valve normally seated on the first-named valve seat, said valve being of sufficiently smaller diameter than the portion of the casing lying between said seats to provide space for the by-passage of lubricant, said last-named space being of smaller area than the discharge port of said casing to thereby eliminate back-pressure between the discharge port of said casing and said valve and thus permit movement of said valve against the action of said spring.

9. In a lubricating system, the combination with a conduit and a bearing, of means for intermittently feeding lubricant under pressure to said conduit, a valve casing associated at its discharge end with the bearing and at its intake end with the conduit, a valve seat at the intake end of said casing, a valve seat between the ends thereof a spring-held ball check valve normally seated on the first-named valve seat, said valve being of sufficiently smaller diameter than the portion of the casing lying between said seats to provide space for the by-passage of lubricant, said space being of no greater area than the discharge port from said casing.

10. In a lubricating system, the combination with a conduit, bearings and means for intermittently forcing lubricant under pressure into said conduit, of valve casings connected at their intake ends with said conduit and at their discharge ends with said bearings, spring-held ball valves in said casings normally disposed to seal the intake ends thereof and adapted to be actuated by inrushing lubricant to seal the casings against passage of said lubricant therethrough, there being free space around said valves of no greater area than the discharge ports of said casings for permitting leakage of lubricant past said ball at all points in the travel thereof, means for relieving the conduit pressure following the completion of the movement of said valves against the action of the springs associated therewith while maintaining said conduit and valve casings filled with the lubricant fed thereto at each operation of the forcing means.

11. In a lubricating system, devices associated with the bearings, each including a casing having an intake port at one end and a discharge port at its other end, spring-held valve mechanism therein normally sealing the intake port and adapted to respond to fluid under pressure entering said intake port to seal the discharge port, a pump, piping connecting the same with said casings, means associated with said piping and said casings for trapping oil therein against backflow and including means for relieving pressure in said piping and casings for permitting spring recovery of said valve mechanism and means for limiting the pressure in said piping and casings to a predetermined maximum degree.

12. In a lubricating system, a source of oil, a pump having its suction port connected therewith, piping connected with the discharge port of said pump, fluid pressure responsive devices associated with said piping and bearings to be lubricated for limiting the flow of lubricant to each bearing, a relief valve controlled connection between the pump and said source of oil for returning surplus oil to the latter and limiting the maximum pressure in said piping and devices and a valve controlled connection between the discharge end of the pump and said source of oil for permitting return of a predetermined volume of oil thereto as said pump completes its discharge stroke to thereby relieve pressure in said piping and devices.

13. In a lubricating apparatus, the combination with a source of oil, a pump, piping and devices associated with said piping and bearings for limiting flow to the latter, of a valve casing disposed between the discharge port of the pump and said piping, connection between the intake end of said casing and said source of oil for permitting flow from the former into the latter, a valve associated with the pump plunger controlling said connection for maintaining the same sealed until the pump plunger has substantially completed its discharge, and a reciprocable member in said casing permitting passage of oil from said pump to said piping and preventing reflow from the latter to said pump and said source of oil, said reciprocable member being fluid pressure actuated in both directions.

14. In a lubricating apparatus, the combination with a source of oil, a pump, piping and devices associated with said piping and with bearings to be lubricated for limiting flow to the latter, of a relief valve controlled connection between the pump and said source of oil for limiting the pressure developed in said pump and piping and returning surplus oil to said source, and a valve associated with the pump plunger for maintaining the discharge port sealed until said plunger has attained a predetermined point in its pressure stroke to thereby build up pressure within said pump prior to discharge through said discharge port.

15. In a lubricating system, the combination with spring-held, fluid pressure responsive devices associated with bearings to be lubricated for limiting flow to the latter, of a pump for feeding said devices, a source of oil, a valve-casing interposed between the discharge port of said pump and said devices and connected at its intake end with said source of oil, a valve controlling said connection, and fluid pressure responsive means within said valve-casing for permitting passage of oil to said devices but preventing reflow from the latter to the pump or source of oil while permitting limited back-flow into said casing to relieve pressure in said devices for permitting spring recovery thereof.

16. In a lubricating system including devices associated with bearings to be lubricated for shutting off flow to the latter after a time interval, a source of oil, a pump having check-valve controlled intake connection with said source, a relief valve controlled return connection between said pump and said source, a discharge port for said pump, a check-valve controlling the same, a connection between said source and the discharge port of said pump between said check-valve and the pump barrel for causing direct return flow of oil from the pump to said source to relieve pressure on said check-valve, and a valve associated with the pump plunger for maintaining said last-named connection sealed until the pump plunger has substantially completed its discharge stroke.

17. In a lubricating system including devices associated with bearings to be lubricated for shutting off flow to the latter after a time interval, a source of oil, a pump having check-valve controlled intake connection with said source, a discharge port for said pump, a check-valve controlling the same, a connection between said source and the discharge port of said pump independently of said check-valve controlled intake connection for permitting direct return flow of oil from the pump to said source, and a valve associated with the pump plunger for maintaining said last-named connection sealed until the pump plunger has substantially completed its discharge stroke.

18. In a lubricating system including devices associated with bearings to be lubricated for shutting off flow to the latter after a time interval, a source of oil, a pump having check-valve controlled intake connection with said source, a discharge port for said pump, a check-valve controlling the same, a connection between said source and the discharge port of said pump independently of said check-valve controlled intake connection for permitting direct return flow of oil from the pump to said source, and a valve associated with the pump plunger for maintaining said last-named connection sealed until the pump plunger has substantially completed its discharge stroke, said valve maintaining said discharge port closed until the pump plunger has attained a predetermined point in its discharge stroke to thereby build up the pump pressure to the point necessary to open the relief valve before discharge from said discharge port.

19. In a lubricating system of the character described including self-restoring devices at bearings to be lubricated for shutting off flow to the latter after delivery to each thereof of a substantially given charge of oil, a plunger pump and piping associated with said devices capable of delivering oil in excess of the aggregate charges for the bearings, means associated with the pump for limiting the maximum attainable pump pressure, means for relieving the pump pressure before the pump plunger beings its suction stroke, and fluid pressure responsive means associated with the pump and piping for trapping oil in the latter and permitting relief of pressure therein to effect self-restoring of said devices upon relief of pump pressure.

20. In a lubricating system of the character described including self-restoring devices at bearings to be lubricated for shutting off flow to the latter after delivery to each thereof of a substantially given charge of oil, a plunger pump and piping associated with said devices capable of delivering oil in excess of the aggregate charges for the bearings, means associated with the pump for limiting the maximum attainable pump pressure, and fluid pressure responsive valve mechanism associated with the pump and piping for trapping oil in the latter and permitting relief of pressure therein to effect self restoring of said devices upon relief of pump pressure without permitting escape of any of the trapped oil.

21. In a lubricating system of the character described including self restoring devices at bearings to be lubricated for shutting off flow to the latter after delivery to each thereof of a substantially given charge of oil, a plunger pump and piping associated with said devices capable of delivering oil in excess of the aggregate charges for the bearings, means associated with the pump for limiting the maximum attainable pump pressure, means for relieving the pump pressure before the pump plunger begins its suction stroke, and fluid pressure responsive valve mechanism associated with the pump and piping for trapping oil in the latter and permitting relief of pressure therein to effect self restoring of said devices upon relief of pump pressure without permitting escape of any of the trapped oil.

22. In a lubricating system, the combination with a conduit and a bearing connected therewith, of means for intermittently feeding lubricant under pressure to said conduit, a casing interposed between the bearing and the conduit, a valve-seat at the intake end of said casing, a second valve-seat between the ends of said casing, there being a cylindrical bore in said casing between said seats, and a springheld spherical piston valve movable between said seats and normally seated on the first-named valve-seat, said valve being of slightly smaller diameter than said bore for permitting leakage past said valve, a check-valve associated with said means for preventing back-flow from the casing and conduit, said valve being adapted to be seated on the second valve-seat responsively to high velocity of flow of liquid into said casing to thereby shut off flow of liquid from the casing to the bearing, said valve being adapted to permit leakage of air through said casing without being thereby moved to the last-mentioned position.

23. In a lubricating system, means for delivering lubricant under pressure at intervals to bearings to be lubricated, the said means including a pump pressure relief means for effecting discharge of lubricant from said pump upon attainment of a substantially predetermined degree of pressure in the latter, and means for preventing delivery of the lubricant from the pump to the bearings until said degree of pump pressure has been attained.

24. In a lubricating system, means for delivering lubricant under pressure at intervals to bearings to be lubricated, the said means including a device for determining the maximum limit of pressure of the lubricant, and means for preventing delivery of the lubricant to said means until the same is under the said maximum pressure.

25. In a force feed lubricating system, the combination with self-restoring fluid pressure responsive devices disposed at outlets to bearings to be lubricated for shutting off flow from said outlets after delivery of a substantially predetermined volume of lubricant from each thereof, of a pump having a discharge port, piping connecting said discharge port with said devices, a second discharge port from said pump, a pump piston, and a valve controlling both said ports operatively associated with said piston for movement coordinately therewith and arranged to cause both said discharge ports to communicate with each other at a predetermined point in the travel of said piston.

26. In a force feed lubricating system, the combination with self-restoring fluid pressure responsive devices disposed at outlets to bearings to be lubricated for shutting off flow from said outlets after delivery of a substantially predetermined volume of lubricant from each thereof, of a pump having a discharge port, piping connecting said discharge port with said devices, a second discharge port from said pump, a pump piston, and a valve controlling both said ports operatively associated with said piston for movement coordinately therewith and arranged to cause both said discharge ports to communicate with each other at a predetermined point in the travel of said piston, said second discharge port constituting a pressure relief port, and a second pressure relief port for said pump equipped with means for preventing discharge of fluid therethrough except under the influence of substantial pump pressure.

27. In a force feed lubricating system, the combination with self-restoring fluid pressure responsive devices disposed at outlets to bearings to be lubricated for shutting off flow from said outlets after delivery of a substantially predetermined volume of lubricant from each thereof, of a pump having a discharge port and equipped with a spring actuated piston, piping connecting said discharge port with said devices, a second discharge port from said pump, a valve controlling both said ports operatively associated with said piston for movement coordinately therewith and arranged to cause both said discharge ports to communicate with each other at a predetermined point in the travel of said piston.

28. In a force feed lubricating system, the combination with self-restoring fluid pressure responsive devices disposed at outlets to bearings to be lubricated for shutting off flow from said outlets after delivery of a substantially predetermined volume of lubricant from each thereof, of a pump having a discharge port and equipped with a spring actuated piston, piping connecting said discharge port with said devices, a second discharge port from said pump, a valve controlling both said ports operatively associated with said piston for movement coordinately therewith and arranged to cause both said discharge ports to communicate with each other at a predetermined point in the travel of said piston.

29. In a lubricating system including piping, a reciprocable piston pump delivering into said piping, and a source of lubricant, of means controlled by the piston of said pump for completely relieving pump and piping pressure before said piston has completed its discharge stroke.

30. In a lubricating system including piping, a reciprocating piston pump delivering into said piping, and a source of lubricant, of means controlled by the piston of said pump for completely relieving pump and piping pressure before said piston has completed its discharge stroke, and maintaining relief of pressure thereafter and until the next succeeding pressure stroke of said piston.

31. In a lubricating system including piping, a reciprocable piston pump delivering into said piping, and a source of lubricant, of means controlled by the piston of said pump for completely relieving pump and piping pressure before said piston has completed its discharge stroke, and maintaining said relief of pressure during the balance of the pressure stroke of said piston.

32. In a lubricating system including piping, a reciprocable piston pump delivering into said piping, and a source of lubricant, of means controlled by the piston of said pump for completely relieving pump and piping pressure before said piston has completed its discharge stroke.

33. In a force feed lubricating system, a reciprocable piston pump, a check-valve controlled pressure relief valve for said pump adapted to permit escape of fluid under pressure from said pump when said pressure exceeds a predetermined degree, a discharge port for said pump, a valve actuated by said piston normally sealing said discharge port, thereby to cause pump pressure to be built up to the maximum degree permitted by said relief valve before discharge of lubricant can be effected from said discharge port, the latter being opened by movement of said valve responsively to travel of said piston after initial discharge of some fluid from said relief port.

34. In a lubricating system including devices for automatically shutting off flow to bearings to be lubricated following initial flow thereto, a source of oil, a pump connected therewith, and means associated with the discharge port of the pump, said devices and said source of oil for causing the return to said source of a predetermined quantity of the oil discharged from the pump, and also causing a substantially similar quantity of oil to be returned from said devices to the said means, thereby to relieve pressure in said devices.

IRVING COWLES.